T. A. EDISON.
Printing Telegraphs.
No. 138,870. Patented May 13, 1873.
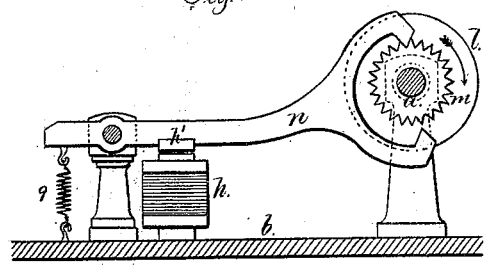
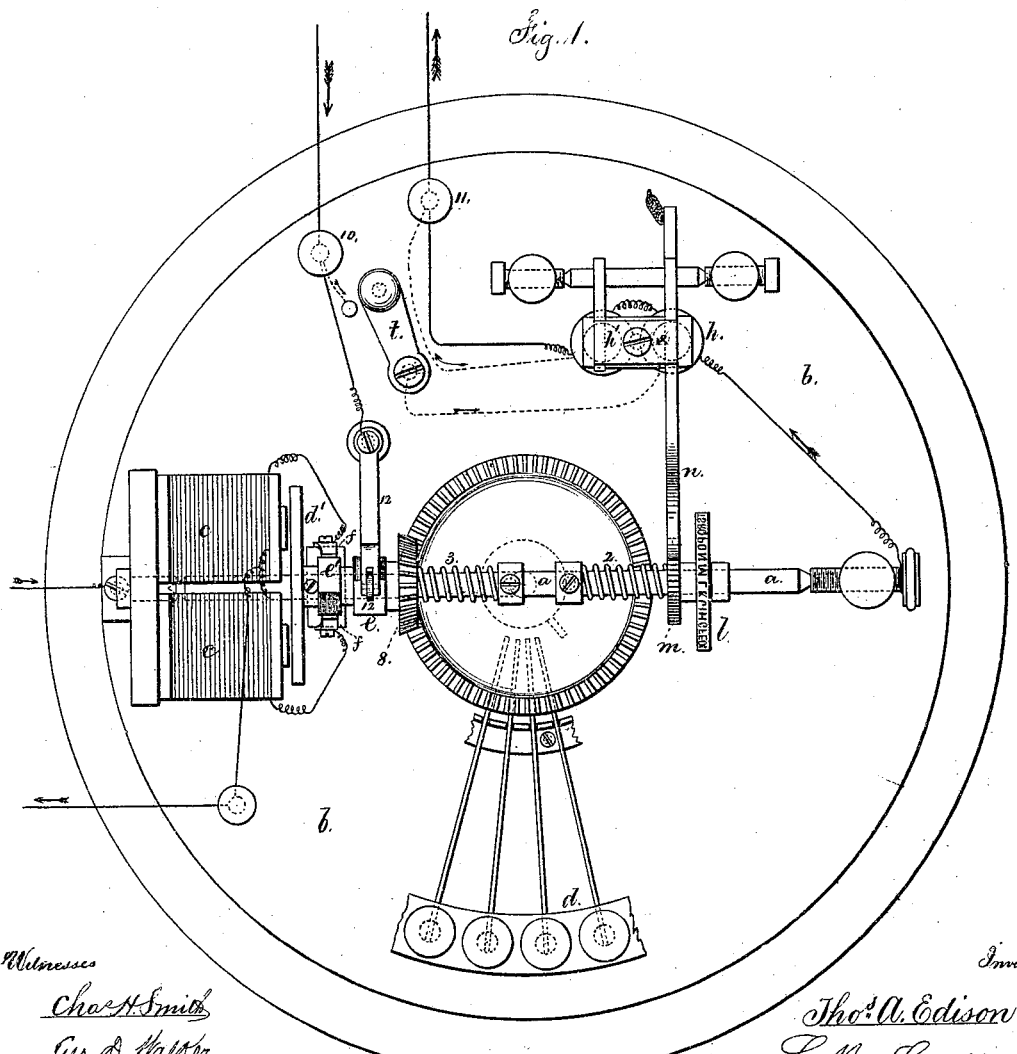
Witnesses
Chas H Smith
Geo. D. Walker
Inventor
Thos. A. Edison
L. W. Serrell Atty.

UNITED STATES PATENT OFFICE.

THOMAS A. EDISON, OF NEWARK, NEW JERSEY, ASSIGNOR TO THE GOLD AND STOCK TELEGRAPH CO., OF NEW YORK, N. Y.

IMPROVEMENT IN PRINTING-TELEGRAPHS.

Specification forming part of Letters Patent No. 138,870, dated May 13, 1873; application filed March 13, 1873.

*To all whom it may concern:*

Be it known that I, THOMAS A. EDISON, of Newark, in the county of Essex and State of New Jersey, have invented an Improvement in Printing-Telegraph Instruments, of which the following is a specification:

This instrument is a combined transmitter and receiver, and the pulsator (which opens and closes the circuit to the type-wheel magnets) and the type-wheel are upon the same shaft, and this shaft is revolved continuously by an electro-motor or other device.

The pulsator and type-wheel are both revolved by frictional contact with their shaft; but the type-wheel only moves with said shaft as the pallets of the type-wheel lever allow the escapement-wheel that is connected to the type-wheel to turn by a step-by-step movement. This lever is vibrated by its magnet and spring each time the pulsator opens and closes the circuit to said magnet; hence said type-wheel is moved by the step-by-step escapement each pulsation of electricity.

In the drawing, Figure 1 is a plan of my improved instrument, and Fig. 2 is an elevation of the type-wheel magnets, levers, and escapement.

The shaft $a$ is supported in suitable supports or standards on the bed $b$, and is revolved continuously by the electro-motor, composed of the electro-magnets $c\,c$, revolving armature $d'$, circuit-breaker $e'$, contact-springs $f\,f$, and connections to a local battery, all of usual character; and it is to be understood that the shafts $a$ of the distant receiving-instruments are each revolved by an electro-motor or other device, and about in unison with the shaft of the transmitter. $e$ is the pulsator, and 12 its contact-roller for opening and closing the circuit to the type-wheel magnets $h$, and said pulsator revolves with the shaft $a$ by friction of the spring 3.

The operation of this pulsator in opening and closing the circuit to said magnets $h$ is the same as that set forth in Letters Patent No. 131,343 granted to me, and the means for stopping the pulsator and impressing from the type-wheel $l$ are substantially the same as in said patent, the pulsator being arrested when a finger-key, $d$, is depressed and its arm brought in the path of a stop upon a shaft connected by gearing to a pinion, 8, that moves with the pulsator. The type-wheel $l$ and its escapement-wheel $m$ are upon a sleeve or otherwise connected, and they are upon said shaft $a$ and move with it by friction through the spring 2 when permitted by the type-wheel lever $n$. The pulsations from $e$ through the main line and magnets $h$ at the distant stations vibrate the armatures $h'$ and levers $n$ in unison, letting off the teeth of the escapement-wheels and allowing the shafts $a$ to revolve the type-wheels by a step-by-step motion.

The connections for the transmitter are shown by full lines in Fig. 1, the current entering by the binder 10 and passing through the pulsator $e$, shaft $a$, and magnets $h$, and by the binder 11 to the line and the distant receiving-instruments. Each instrument is provided with a switch at $t$, and the connections for the distant receiving-machines are shown by dotted lines in same figure.

The mechanism for impressing the letter and printing, when the type-wheels are stopped, may be of any desired character, and do not form part of this invention.

I claim as my invention—

The type-wheel and pulsator both upon the same shaft and revolved by friction, in combination with the type-wheel lever, escapement, and electro-magnet, substantially as and for the purposes set forth.

Signed by me this 7th day of March, A. D. 1873.

THOMAS A. EDISON.

Witnesses:
GEO. T. PINCKNEY,
CHAS. H. SMITH.